(12) United States Patent
Mizutani et al.

(10) Patent No.: US 7,474,443 B2
(45) Date of Patent: Jan. 6, 2009

(54) IMAGE FORMATION USING DOTS OF DIFFERENT SPATIAL DENSITY DETERMINED BASED ON COMPARISON OF PIXEL VALUE TO THRESHOLD VALUE MATRIX AND ERROR ADDED BY ERROR DIFFUSION

(75) Inventors: Toshiyuki Mizutani, Hino (JP); Kenichirou Hiramoto, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 469 days.

(21) Appl. No.: 11/267,846

(22) Filed: Nov. 4, 2005

(65) Prior Publication Data

US 2006/0098045 A1    May 11, 2006

(30) Foreign Application Priority Data

Nov. 10, 2004    (JP) .............................. 2004-326278

(51) Int. Cl.
*H04N 1/405* (2006.01)
(52) U.S. Cl. ........................ 358/3.03; 358/3.1; 358/3.13
(58) Field of Classification Search .................. 358/1.9, 358/3.02, 3.03, 3.06, 3.09, 3.1, 3.12, 3.13; 347/15
See application file for complete search history.

(56) References Cited

U.S. PATENT DOCUMENTS

| 5,751,470 | A | * | 5/1998 | Damon | ...................... 358/3.23 |
| 6,031,627 | A | * | 2/2000 | Kakutani | ...................... 358/1.9 |
| 6,264,300 | B1 | | 7/2001 | Warner | |
| 6,338,538 | B1 | | 1/2002 | Toshiaki | |
| 6,439,682 | B1 | * | 8/2002 | Kakutani | ...................... 358/1.9 |
| 7,322,664 | B2 | * | 1/2008 | Kakutani et al. | ............. 358/1.9 |
| 2005/0253882 | A1 | * | 11/2005 | Mizutani et al. | ............... 347/9 |
| 2006/0044339 | A1 | * | 3/2006 | Mizutani et al. | .............. 347/15 |
| 2006/0181738 | A1 | * | 8/2006 | Mizutani et al. | ........... 358/3.02 |

FOREIGN PATENT DOCUMENTS

| JP | 2001-3208777 | 7/2001 |
| JP | 2003-501300 | 1/2003 |

* cited by examiner

Primary Examiner—Scott A Rogers
(74) Attorney, Agent, or Firm—Lucas & Mercanti, LLP

(57) ABSTRACT

An image forming apparatus, for forming an image with plural types of dots having different densities per unit area in a same hue, including: a section to compare between a pixel value of a target pixel and a value of a prescribed threshold value matrix, and to determine, based on the comparison, whether to form a first type of dot at a position corresponding to the target pixel; a section for calculating a corrected threshold value matrix from the prescribed threshold value matrix; a section for calculating a second determining condition by reflecting the corrected threshold value matrix; and a section for determining whether to form the second type of dot, based on a target pixel value added an error with an error diffusion process and the second determining condition, at the position where the first type of dot has been determined not to be formed.

19 Claims, 11 Drawing Sheets

| 151 | 330 | 266 | 350 | 162 | 319 | 223 | 342 | 302 |
|-----|-----|-----|-----|-----|-----|-----|-----|-----|
| 385 | 253 | 200 | 285 | 394 | 236 | 370 | 180 | 261 |
| 188 | 290 | 380 | 242 | 191 | 336 | 175 | 281 | 400 |
| 273 | 357 | 166 | 344 | 269 | 296 | 257 | 347 | 215 |
| 327 | 225 | 307 | 213 | 373 | 155 | 385 | 197 | 325 |
| 158 | 392 | 198 | 325 | 246 | 316 | 235 | 313 | 168 |
| 313 | 234 | 348 | 172 | 403 | 220 | 367 | 210 | 357 |
| 180 | 378 | 265 | 293 | 193 | 341 | 162 | 275 | 294 |

LOW & HIGH DENSITY DOTS 8.5%

HIGH DENSITY DOT 1%

LOW DENSITY DOT 7.5%

IMAGE FORMATION USING DOTS OF DIFFERENT SPATIAL DENSITY DETERMINED BASED ON COMPARISON OF PIXEL VALUE TO THRESHOLD VALUE MATRIX AND ERROR ADDED BY ERROR DIFFUSION

This application is based on Japanese Patent Application No. 2004-326278 filed on Nov. 10, 2004 in Japanese Patent Office, the entire content of which is hereby incorporated by reference.

BACKGROUND OF THE INVENTION

1. Field of the Invention

The present invention relates to an image forming apparatus, an image forming method and an image forming program, particularly to an image forming apparatus, an image forming method and an image forming program for forming an image by distribution of two or more types of dots having different densities per unit area in the same hue.

2. Background of the Invention

A printing apparatus for printing an image by a personal computer or the like is exemplified by a printer using the ink of three colors, magenta (M), cyan (C) and yellow (Y), and a printer using the ink of four colors composed of the aforementioned three colors plus black (K). Such a printer allows an image to be formed by turning on or off the dot of each hue.

In recent years, by contrast, there have appeared many types of printers wherein, in order to get a high-quality output image, inks of different densities within the same hue (e.g. dark colored ink and light colored ink) are used or different ink dot diameters are utilized so that a dot having a plurality of gradation levels in one hue is formed.

However, even if the aforementioned dots each having a plurality of gradation levels in one-hue can be formed, the image may deteriorate in some cases if these dots are not arranged adequately. For example, to get an output image having a large dot (having a large area, hence high dot density per unit area) and a small dot (having a small area, hence low dot density per unit area), binary halftone processing is applied to each dot; then the pixel values are added up. Thus, although the distribution of small dots alone (FIG. 11(a)) and distribution of large dots alone (FIG. 11(b)) are satisfactory, distribution of the overlapped dots cannot be said to be satisfactory in many cases, with the result that the graininess in the final image considerably deteriorate (FIG. 11(c)).

Solution to this problem has been found in the method wherein a plurality of types of dots having the different densities per unit area are arranged in the form associated with one another. For example, such a method is disclosed in Patent Document 1.

In Patent Document 1, dot positions for relatively high density dots per unit area are determined by dither method, dots positions for relatively low density dots per unit area are determined by error diffusion method, and when performing the error diffusion, by reflecting the quantization error caused by the processing of the relatively high density dots, good distributions of the two types of dots are obtained.

Incidentally, "two or more types of dots having different densities per unit area" includes in addition to the dots having different densities such as high density dot, mid density dot and low density dots, the dots having different dot sizes such as large dot, middle dot and small dot, and combinations of different density dots and different sized dots such as high density dot and small dot, or large dot and low density dot.

Patent Document 1: Official Gazette of Japanese Patent No. 3208777

Patent Document 2: Official Gazette of U.S. Pat. No. 6,264,300

Patent Document 3: Unexamined Japanese Patent Application Publication No. 2003-501300

However, in the aforementioned Patent Document 1, the reflection of the quantization error is restricted to unprocessed pixels, and processed pixels cannot be reflected with the quantization error. Sometimes, this causes the case where dots are not well dispersed.

The example of this case is shown in FIG. 12. FIG. 12 is a figure of the image formed according to Patent Document 1, where the high density dots are determined by dither method, and low density dots are processed by the error diffusion method reflected with the quantization error caused by the dither method. In this method the processing is performed with repetition of the scanning direction, in the figure, from right to left and left to light, while proceeding from up to down, this movement is so called a zigzag scanning. As can be seen from FIG. 12, in the unprocessed pixel (at underside of the high density dot or down stream of right/left scanning direction) dot generation is suppressed by the influence of the error from the high density dot. However regarding the low density dots generated previously to the high density dot generation, since the influence of the error can not be reflected, the low density dots are generated at the upside or upstream scanning side of the high density dots. This causes to worsen the dispersion of the total image and to deteriorate the image quality.

Therefore, a method for obtaining better dispersion has been required.

SUMMARY OF THE INVENTION

The object of the present invention is to provide an image forming apparatus, an image forming method and an image forming program for forming an image using two or more types of dots having different densities per unit area in the same hue, wherein excellent dot distribution are ensured.

One aspect of the embodiment to achieve the aforementioned object is an image forming apparatus, for forming an image with using two or more types of dots having different densities per unit area in a same hue, comprising:

a first dot formation determining section, for making comparison between a pixel value of a target pixel in the input image data and a first threshold value allocated at a position corresponding to the target pixel in a prescribed threshold value matrix, and for determining, based on a result of the comparison, whether or not a first type of dot, out of two or more types of dots having the different densities per unit area, should be formed at a position corresponding to the target pixel in an image to be formed;

a first calculating section for calculating a corrected threshold value matrix by correcting the prescribed threshold value matrix;

a second calculating section for calculating a second determining condition by reflecting the corrected threshold value matrix, to determine whether or not a second type of dot out of the two or more types of dots should be formed; and a second dot formation determining section for determining whether or not the second type of dot should be formed, based on a value obtained by assigning an error to the pixel value of the target pixel with an error diffusion process and the second determining condition, at the position where the first dot formation section has determined not to form the first type of dot.

DETAILED DESCRIPTION OF THE INVENTION

Figure 1:
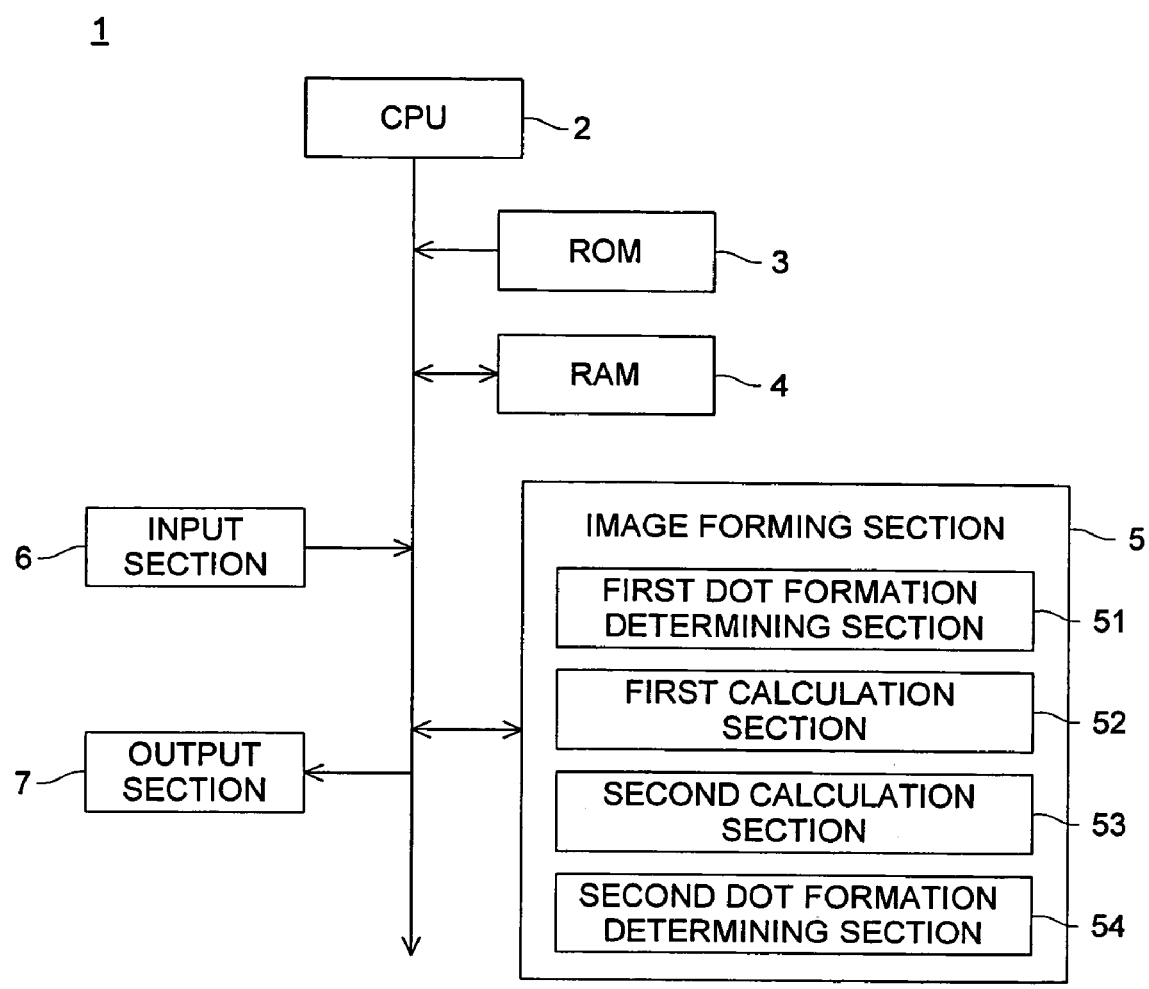
FIG. 1 is a block diagram representing the schematic configuration of an image forming apparatus of the present invention.

The aforementioned object can be achieved by the following items of the embodiments:

(1) An image forming apparatus, for forming an image with using two or more types of dots having different densities per unit area in a same hue, comprising:

a first dot formation determining section, for making comparison between a pixel value of a target pixel in the input image data and a first threshold value allocated at a position corresponding to the target pixel in a prescribed threshold value matrix, and for determining, based on a result of the comparison, whether or not a first type of dot, out of two or more types of dots having the different densities per unit area, should be formed at a position corresponding to the target pixel in an image to be formed;

a first calculating section for calculating a corrected threshold value matrix by correcting the prescribed threshold value matrix;

a second calculating section for calculating a second determining condition by reflecting the corrected threshold value matrix, to determine whether or not a second type of dot out of the two or more types of dots should be formed; and a second dot formation determining section for determining whether or not the second type of dot should be formed, based on a value obtained by assigning an error to the pixel value of the target pixel with an error diffusion process and the second determining condition, at the position where the first dot formation section has determined not to form the first type of dot.

According to the item (1) as described above, in the first dot formation determining section, the dot formation is determined by the dither method using the threshold value matrix, in the second dot formation determining section dot formation is determined by the error diffusion method, and further the value of the threshold value matrix used in the first dot formation determination is reflected in that error diffusion method. With this procedure, since the dot is generated compulsorily in the first dot formation determining section, the position of the dot can be controlled, further, since the threshold value matrix is reflected in the error diffusion method, the interference of dot dispersion by the first dot formation determining section with the dot dispersion by the second dot formation determining section can be prevented. This enables the good dot dispersion to ensure formation of high quality image.

(2) The image forming apparatus described in (1), wherein the second calculating section adds the value of the corrected threshold value matrix onto the threshold value of the second determining condition to determine whether to form the second type of dot.

According to the item (2), since the second calculating section adds the value of the corrected threshold value matrix onto the threshold value to determine whether to form the second type of dot by the error diffusion method, the interference of dot dispersion by the first dot formation determining sections with the dot dispersion by the second dot formation determining sections can be-prevented concretely. This enables the good dot dispersion to ensure formation of high quality image.

(3) The image forming apparatus described in (1), wherein the second calculating section uses the value of the corrected threshold value matrix as the threshold value of the second determining condition to determine whether to form the second type of dot.

According to the item (3), since the second calculating section uses the value of the corrected threshold value matrix as the threshold value to determine whether to form the second type of dot by the error diffusion method, the interference of dot dispersion by the first dot formation determining sections with the dot dispersion by the second dot formation determining sections can be prevented concretely. This enables the good dot dispersion to ensure formation of high quality image.

(4) The image forming apparatus described in (1), wherein the second calculating section adds the value of the corrected threshold value matrix onto the pixel value of the target pixel, to calculate the second determining condition to determine whether to form the second type of dot.

According to the item (4), since the second calculating section adds the value of the corrected threshold value matrix onto the pixel value of the target pixel, when calculates the second determining condition to determine whether to form the second type of dot by the error diffusion method, the interference of dot dispersion by the first dot formation determining sections with the dot dispersion by the second dot formation determining sections can be prevented concretely. This enables the good dot dispersion to ensure formation of high quality image.

(5) The image forming apparatus described in any one of (1)-(4), wherein the first calculating section subtracts a certain value from the value of the threshold value matrix so that the average value of the threshold value matrix value becomes zero.

According to the item (5), since the first calculating section subtracts a certain value from the value of the threshold value matrix so that the average value of the threshold value matrix value becomes zero, the ratio of dots generated by reflecting the threshold value matrix value can be made equal in macroscopic view. This enables the good dot dispersion to ensure formation of high quality image.

(6) The image forming apparatus described in any one of (1)-(5), wherein the first calculating section varies the amplitude of the threshold value matrix according to the pixel value of the target pixel.

According to the item (6), since the first calculating section varies the amplitude of the threshold value matrix according to the pixel value of the target pixel, when the pixel value is such a value with which a specific texture is generated, the generation of specific texture to the error diffusion method can be prevented by increasing the amplitude of the threshold value matrix. This enables the good dot dispersion and ensures the formation of high quality image.

(7) The image forming apparatus described in any one of (1)-(6), wherein the first calculating section varies the amplitude of the threshold value matrix according to the ratio of the dots determined to be generated by the first dot formation determining section.

According to the item (7), since the first calculating section varies the amplitude of the threshold value matrix according with the ratio of the dots determined to be generated by the first dot formation determining section, in cases where dots are distinctly conspicuous, for example, at the starting of the dot appearance, the interference of dots with each other can be prevented by increasing the amplitude of the threshold value matrix. This enables the good dot dispersion and ensures the formation of high quality image.

(8) The image forming apparatus described in any one of (1)-(7), the second type of dot used in the second type of dot determining section has lower density per unit area than the density per unit area of the first type of dot.

According to the item (8), since the second type of dot has lower density per unit area than that of the first type of dot, characteristic of the first type of dot, which is visually conspicuous, can be controlled. This enables the good dot dispersion and ensures the formation of high quality image.

(9) The image forming apparatus described in any one of (1)-(8), the threshold value matrix is a dot dispersion type threshold value matrix.

According to the item (9), since the threshold value matrix is a dot dispersion type threshold value matrix, when the first type of dot is generated, the second type of dot becomes difficult to be generated in the vicinity of the first type of dot. As the result, the good dot dispersion of the dot dispersion type can be achieved in total.

(10) The image forming apparatus described in any one of (1)-(8), the threshold value matrix is a dot fattening type (dot concentration type) threshold value matrix.

According to the item (10), since the threshold value matrix is a dot fattening type (dot concentration type) threshold value matrix, when the first type of dot is generated, the second type of dot becomes easy to be generated in the vicinity of the first type of dot. As the result, the good dot dispersion of the dot fattening type can be achieved in total.

(11) An image forming method, for forming an image using two or more types of dots having different densities per unit area in a same hue, comprising:

a first dot formation determining step, for making comparison between a pixel value of a target pixel in the input image data and a first threshold value allocated at a position corresponding to the target pixel in a prescribed threshold value matrix, and for determining, based on a result of this comparison, whether or not a first type of dot out of two or more types of dots respectively having different densities per unit area, should be formed at a position corresponding to the target pixel in an image to be formed;

a first calculating step for calculating a corrected threshold value matrix by correcting the prescribed threshold value matrix;

a second calculating step for calculating a second determining condition by reflecting the corrected threshold value matrix, to determine whether or not a second type of dot out of the two or more types of dots should be formed; and a second dot formation determining step for determining whether or not the second type of dot should be formed, based on a value obtained by assigning an error to the pixel value of the target pixel with an error diffusion process and the second determining condition, at the position where the first dot formation section has determined not to form the first type of dot.

According to the item (11) as described above, in the first dot formation determining step, the dot formation is determined by the dither method using the threshold value matrix, in the second dot formation determining step dot formation is determined by the error diffusion method, and further the value of the threshold value matrix used in the first dot formation determination is reflected in that error diffusion method. With this procedure, since the dot is generated compulsorily in the first dot formation determining step, the position of the dot can be controlled, further, since the threshold value matrix is reflected in the error diffusion method, the interference of dot dispersion by the first dot formation determining step with the dot dispersion by the second dot formation determining step can be prevented. This enables the good dot dispersion to ensure formation of high quality image.

(12) A program for enabling a computer to realize following functions for forming an image with using two or more types of dots having different densities per unit area in a same hue, the functions comprising:

a first dot formation determining function, for making comparison between a pixel value of a target pixel in the input image data and a first threshold value allocated at a position corresponding to the target pixel in a prescribed threshold value matrix, and for determining, based on a result of the comparison, whether or not a first type of dot, out of two or more types of dots having the different densities per unit area, should be formed at a position corresponding to the target pixel in an image to be formed;

a first calculating function for calculating a corrected threshold value matrix by correcting the prescribed threshold value matrix;

a second calculating function for calculating a second determining condition by reflecting the corrected threshold value matrix, to determine whether or not a second type of dot out of the two or more types of dots should be formed; and a second dot formation determining function for determining whether or not the second type of dot should be formed, based on a value obtained by assigning an error to the pixel value of the target pixel with an error diffusion process and the second determining condition, at the position where the first dot formation section has determined not to form the first type of dot.

According to the item (12), the same effect as the effect of the embodiment (11) can be achieved. This enables the good dot dispersion to ensure formation of high quality image.

PREFERRED EMBODIMENTS OF THE INVENTION

Referring to the drawings, the following describes the image forming apparatus image forming method and image forming program of the present invention, without the present invention being restricted to the examples given in the drawings.

EMBODIMENT 1

In the first place, the first embodiment will be described with reference to FIGS. 1 through 7.

FIG. 1 is a block diagram representing the schematic configuration of an image forming apparatus 1 as a first embodiment of the present invention;

The image forming apparatus 1 can be mounted on an output apparatus (image recording means) such as an inkjet printer known in the prior art. It quantizes, for each pixel, the input value composed of multi-gradation image data where each pixel constituting the image is assigned with the image data having a predetermined number of bits (a predetermined number of gradations), and converts the result into the output value composed of pseudo-halftone image data.

As shown in FIG. 1, the image forming apparatus 1 is equipped with: a first dot formation determining section 51 for implementing the first dot formation determining function in the first dot formation determining step to be described later; a second dot formation determining section 54 for implementing the second dot formation determining function in the second dot formation determining step; a first calculating section 52 for implementing the first calculating function in the first calculating step; and a second calculating section 53 for implementing the second calculating function in the second calculating step.

The image forming apparatus 1 comprises a CPU (Central Processor Unit) 2, ROM (Read Only Memory) 3, RAM (Random Access Memory) 4 etc. In the image forming apparatus 1, an image forming program for processing the image data is stored in the ROM 3. Using the RAM 4 as a work area, in each processing of the image forming section, the image forming program stored in the ROM 3 is read out and implemented various forms of processing equipped with the aforementioned functions according to the image forming program. To put it another way, the image forming program allows the image forming apparatus 1 to implement various forms of processing to be described later.

The following describes the image forming method as the first embodiment.

In the first place, the following describes the method for forming two or more types of dots having different densities per unit area for one hue: The method for forming two or more types of dots having different densities per unit area includes the method of changing the ink density for each dot, and the method for changing the diameter of each dot.

In one of the examples for the method of changing the ink density, inks of light color and dark colors are prepared in advance, and each of these inks is emitted from a different head. One and the same head is equipped with nozzles for emitting each type of ink. Further, liquid ink is used in some cases while a dark colored ink and transparent ink are used to get a light color, in other cases.

The dot diameter is changed, for example, when the cycle of driving the inkjet printer head is adjusted to change the dot diameter (ink particle size). To put it another way, if the drive cycle is short, the dot diameter is reduced. If the drive cycle is long, the dot diameter is increased in proportion to the length thereof. It is also possible to arrange such a configuration that one and the same head equipped with nozzles each for forming dots having different diameters, or a head equipped with-nozzles, each for forming dots having a diameter different from that of the other nozzle, is arranged in advance.

In the present embodiment, the image processing is applicable to the inkjet printer having different heads for ejecting respectively two types of light colored ink and dark colored ink to form two types of light and dark dots for each color, the light colored ink and the dark colored ink being prepared in advance.

Figure 2:
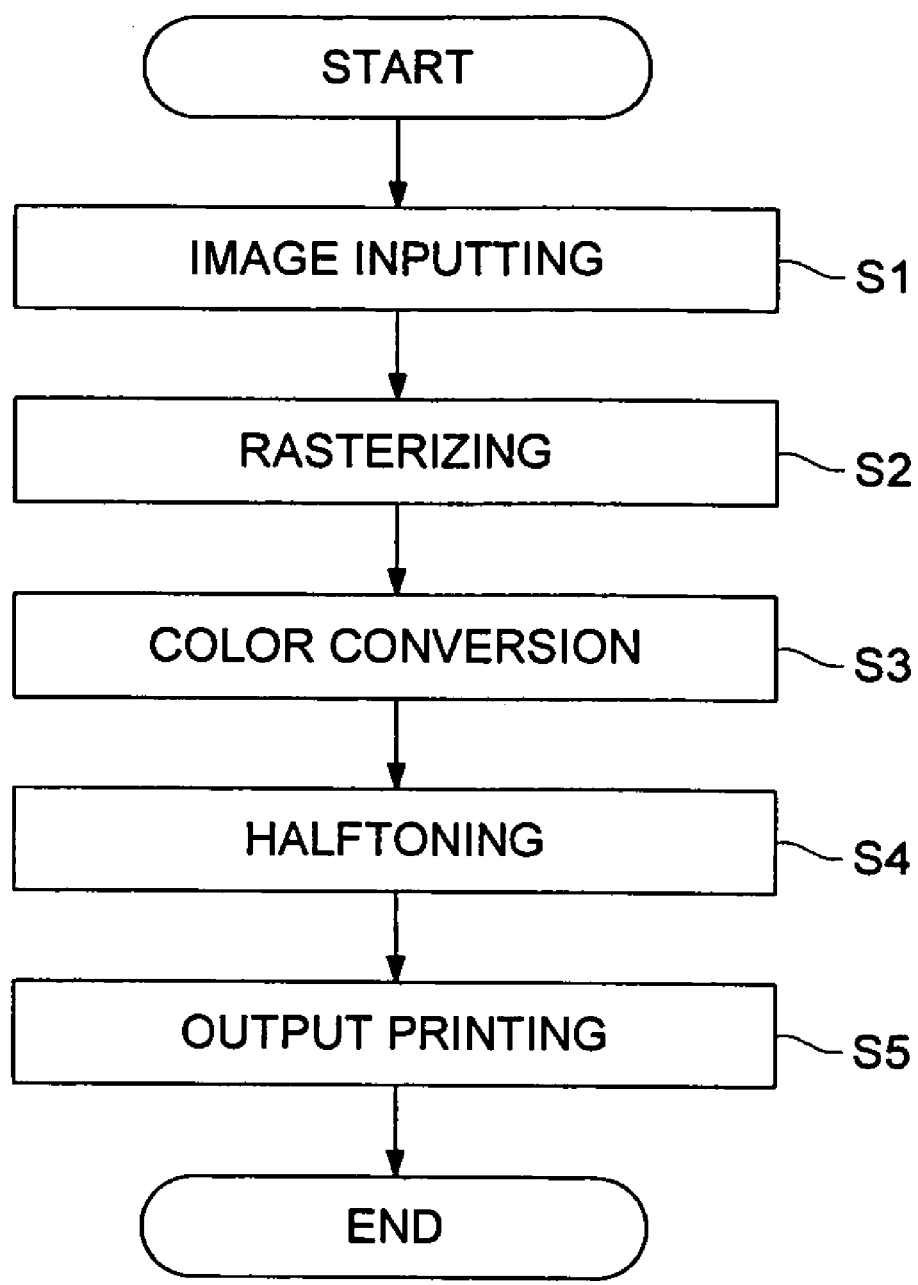
FIG. 2 is a flowchart representing a flow from the input of an original image to the output of the output image.

Referring to the flowchart given in FIG. 2, the following describes the flow of operations ranging from inputting of an original image to outputting by a printer.

The image data composed of multi-gradation image data (pixel value of target pixel in the input image) is inputted into the RAM of the image forming apparatus 1 (Step S1), and the inputted image is converted from the vector data into the raster data (rasterization), as required (Step S2).

Then color conversion is carried out in conformity to the printer used for printing (Step S3). To put it more specifically, the color composed of red, green and blue (RGB) given on the display is converted into data of CMY(K)—cyan, magenta, yellow and (black)—in order to print it on reflective media.

Based on this data, halftone processing (details to be described later) is performed (Step S4). The type and arrangement of dots are determined by halftone processing. In the image subsequent to color conversion, processing is carried out for each pixel by forward scanning or zigzag scanning.

After halftone processing as described above, the output is printed by the printer (Step S5).

Figure 3:
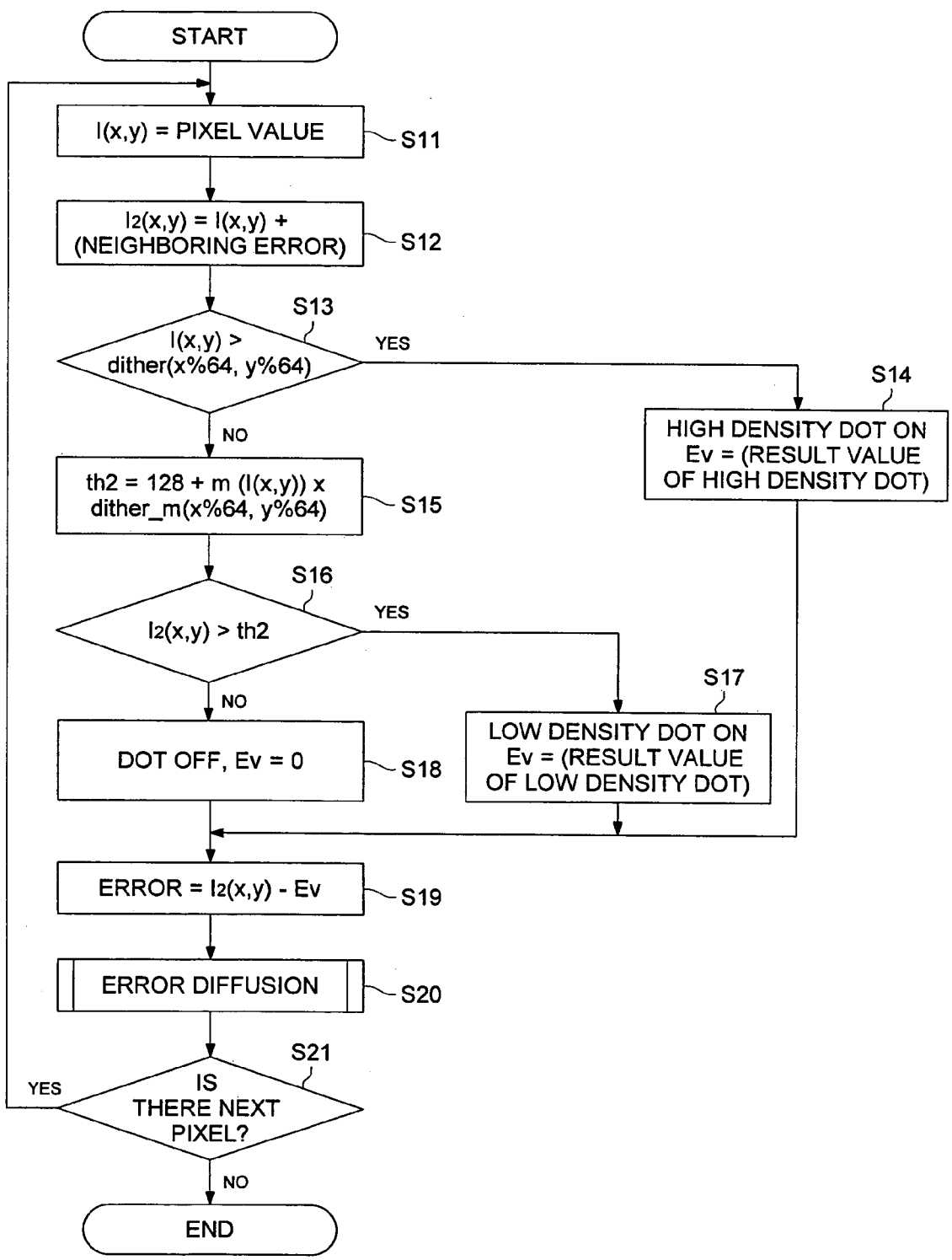
FIG. 3 is a flowchart representing the halftone processing in the first embodiment.

Referring to the flowchart of FIG. 3, the following describes the halftone processing in Step S4:

FIG. 3 is a flowchart representing the halftone processing in an inkjet printer for forming two types of high density dot and low density dot for the ink of each color.

The first dot formation determining step is performed by the first dot formation determining section (the first dot formation determining function of the image forming program) 51. Dither processing is employed in the first dot formation determining step. Here the dither (x, y) denotes the threshold value matrix stored in advance. In the present embodiment, so-called a dot dispersion type threshold value matrix is used. Herein, x denotes the pixel position in the main scanning direction and y denotes the pixel position in the sub scanning direction. This matrix has a size of 64×64 pixels. The input image is composed of 8 bits (composed of 0 through 255 values), and a predetermined value to be described later is 150. Accordingly, the input pixel value and a predetermined value are added up, and the gradation value of 150 through 405 is included. It should be noted, however, that the threshold value matrix is not restricted thereto. In the present embodiment, arrangements are made in such a way as to calculate the remainder obtained by dividing x by 64 and the remainder obtained by dividing y by 64, with respect to the pixel position (x, y), whereby the value of the threshold value matrix "dither (x % 16, y % 16)" is obtained.

The pixel value (input pixel value) in the predetermined target pixel is set to I (x, y) (Step S11). In this embodiment, since a zigzag scanning is performed where the scanning of reciprocating direction (both of forward and backward in the main scanning direction) is repeated, while the processing proceeds in the sub scanning direction, therefore, when y is odd number x increases, and when y is even number x decreases. Further, for the second dot formation determining section 54, the corrected pixel value is calculated by adding to the pixel value I (x, y) the neighboring error dispersed from the processed pixel by the error calculation section and error diffusion section, to be described later, to obtain the corrected pixel value $I_2(x, y)$ (Step S12).

Next, I (x, y) is compared with the value of threshold value matrix dither (x % 64, y % 64) stored in advance (Step S13).

When the input image is composed of n bits of data, the aforementioned threshold value matrix is composed of values each of which is equal to or greater than a predetermined value greater than 0 and smaller than the maximum value $2^n$ taken by the pixel value of the input image. To put it another way, in the present embodiment, the input image is composed of 8 bits. Accordingly, the predetermined value is greater than 0 and smaller than 256. To put it more specifically, the predetermined value is 150. Thus, this predetermined value makes it possible to adjust the pixel value wherein high density dots appear, and hence to control the recorded ratio of the high density and low density dots. If, as a result of this calculation, it has been determined that I (x, y) is greater than the value of the threshold value matrix dither (x % 64, y % 64), then the high density dot is turned on, and the result value of the high density dot (512 in this case) is substituted into the result value Rv (Step S14).

Conversely, when it has been determined that pixel value I (x, y) is not greater than the dither (x % 64, y % 64), the system goes to the second dot formation determining step implemented by the second dot formation determining section 54. This second dot formation determining step utilizes the processing of error diffusion.

In the first place, calculation is made to get the threshold value th2 used in the second dot formation determining step (Step S15). Herein, the first calculating section 52 conducts the first calculating process to correct the value of the threshold value matrix in the first dot formation determining process. And the second calculating section 53 conducts the second calculating process to add the value of the corrected threshold value matrix corrected in the first calculating process onto the threshold value (herein, 8 bit processing is performed, and the threshold value is 128) for determining dot formation by utilizing the error diffusion process.

Figure 4:
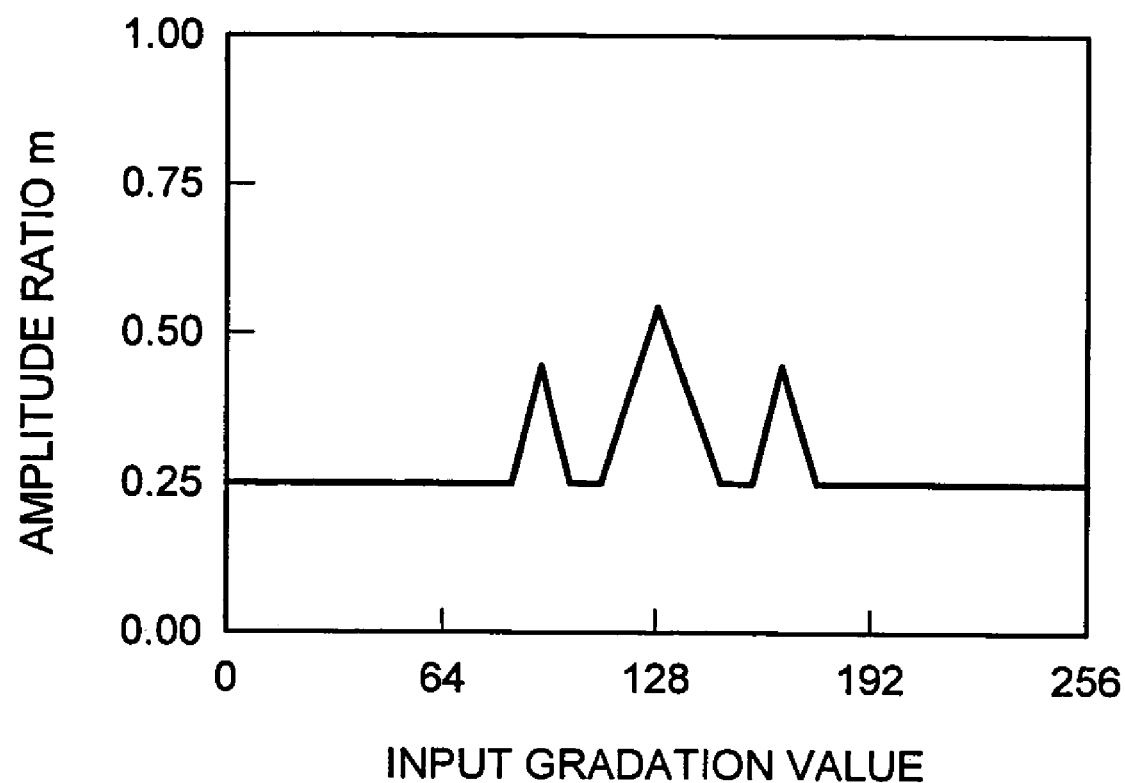
FIG. 4 is a chart representing an example of the table for determining the amplitude with respect to the gradation value in the first embodiment.

To put it more specifically, firstly in the first calculating process, the threshold value matrix shifted (subtraction) by a certain value such that the average value becomes zero is stored as the dither_m(x, y) in advance. Further in the first calculating process, the term m (I(x, y)), which modulates the amplitude of threshold value matrix according to the pixel value of the target pixel, is multiplied to the value of this matrix dither_m(x % 64, y % 64), and the resultant value of m(I(x, y)) x dither _m(x % 64, y % 64) is added to the threshold value of error diffusion process 128 in the second calculating process. Herein, in the first calculating process, the amplitude of the threshold value matrix is varied based on the relation shown in FIG. 4. The term m(I(x, y)) to modulate the amplitude of the threshold value matrix is multiplied in order to prevent generation of texture by increasing the amplitude ratio in the gradation value region where the texture specific to the error diffusion process is apt to appear( for example, as shown in FIG. 4, near the gradation value ½, ⅓, or ⅔ of the maximum value to be taken by the pixel value). Alternatively, the amplitude can be increased by the first calculating process, at the gradation value range where the high density dot starts to appear.

The th2 calculated in the aforementioned manner is compared with $I_2$ (x, y) (Step S16). If the $I_2$ (x, y) is greater than th2, the low density dot is turned on, and the result value (255 in this case) of the low density dot is substituted into the Ev (Step S17). If the $I_2$ (x, y) is not greater than th2, the dot is turned off, and 0 is substituted into the Ev (Step S18).

After that, error calculation, $I_2$ (x, y)–Ev, is carried out by the error calculation section (Step S19) with using the result value Ev of S14, S18 and S18. Then a weight is assigned to the error for diffusion to unprocessed neighboring pixels (Step S20).

A decision step is taken to determine if there is the next pixel or not (Step S21). Upon processing of all pixels, halftone processing terminates. Lastly, the image forming apparatus 1 issues an instruction to all pixels to instruct which dots should be formed and which dots should not be formed. The image recording section records (outputs) the image.

Figure 5:
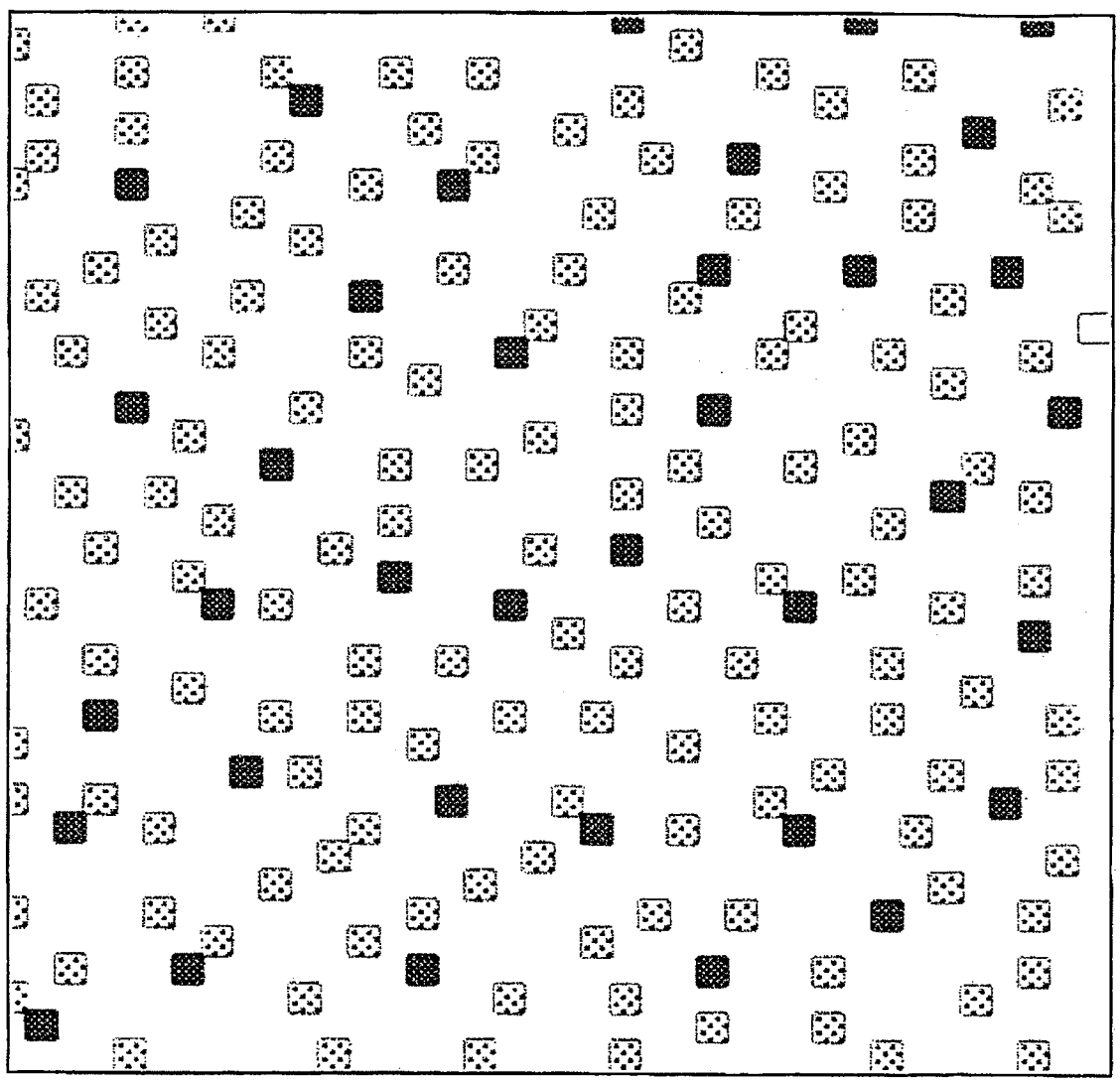
FIG. 5 is an image diagram showing the result of halftone processing in the first embodiment.

FIG. 5 shows an example of the image obtained from the aforementioned processing.

Figure 12:
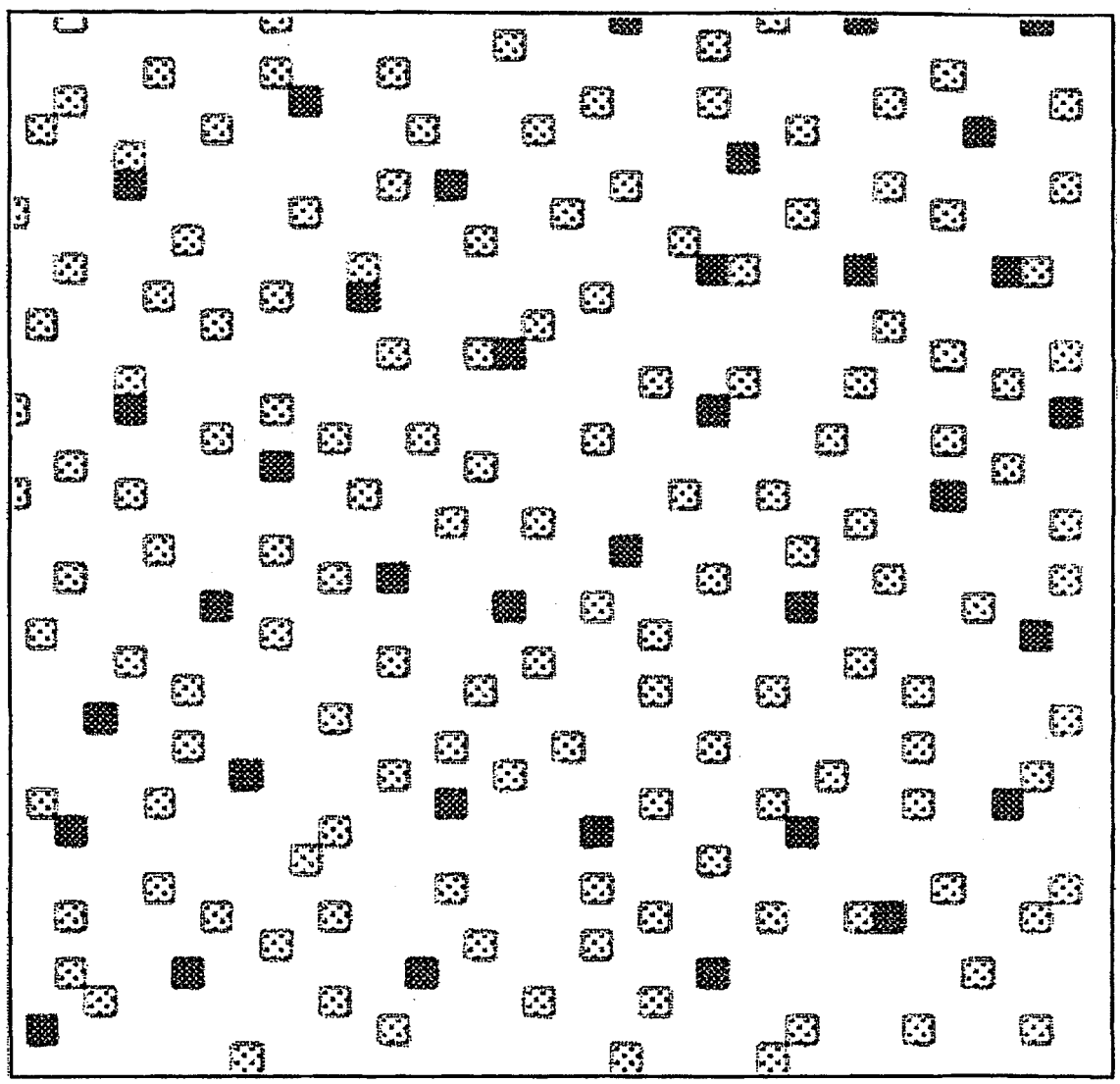
FIG. 12 is an image diagram showing the result of halftone processing according to the method of Patent Document 1.

It can be seen by comparing FIG. 5 with FIG. 12 showing the conventional example that the low density dots are hardly generated in the vicinity of the high density dots. In this manner, according to the present embodiment, the high density dots formed by the first dot formation determining section do not interfere with the low density dots formed by the second dot formation determining section, as the result, good overall dot dispersion is achieved.

The logic why the low density dot becomes difficult to appear in the vicinity of high density dot is described below.

Figures 6, 7:
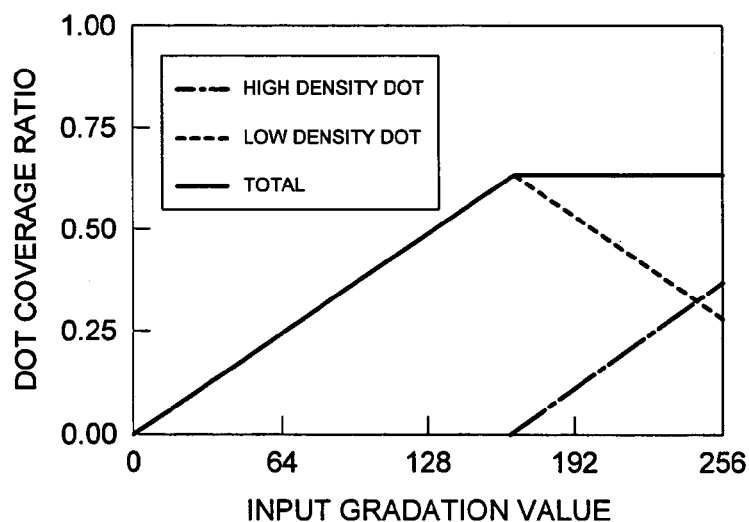
FIG. 6 is a diagram for explaining the principle that the low density dot becomes difficult to be generated in the vicinity of the high density dot.
FIG. 7 is a graph representing an example of the table for determining the ratio of high density and low density dots with respect to the input gradation value in the first embodiment.

FIG. 6 shows an example of threshold value matrix composed of more than 150 threshold values. This threshold value matrix is a dot dispersion type matrix. When all the input pixel values corresponding to FIG. 6 are 190, at all the pixels corresponding to the threshold values not greater than 190, the high density dots are formed as the shaded area in FIG. 6. At the pixels other than the above case, the second dot formation determining section, which determines the dot positions with error diffusion process, determines whether to form the low density dots. As can be seen from FIG. 6, when dither matrix of dot dispersion type is used, pixels with relatively great threshold values enclose the pixel determined to form the dot. By adding the corrected value of this threshold value matrix onto the threshold value of the error diffusion process to be used by the second dot formation determining section, the threshold value to be used by the second dot formation determining section becomes large in the vicinity of the pixels where high density dots are formed, to make the formation of low density dot difficult. As the result, good dot dispersion of both the high density dots and the low density dots can be achieved. Incidentally, when the threshold value matrix of dot fattening type is used, the reversal effect can be attained.

Assume that the input value is given in terms of an 8-bit value, the predetermined value is 150, the result value of a large dot is 512, and that of a small dot is 255. When the dot formation determination is executed by the image forming method of the present embodiment, the high density dots can be mixed before the dot coverage ratio of the low density dots reaches 100%, as shown in FIG. 7. As can be seen from FIG. 7, the ratio of low density dots is reduced by the occurrence of large dots. This is because an error is resolved by high density dots having been forced to appear, with the result that low density dots cannot easily appear. In this way, according to the image forming method of the present embodiment, without utilizing a separation process for dot coverage ratio of high and low density dots, the dot coverage ratio shown in FIG. 7 can be realized.

It is also possible to make such arrangements that the predetermined value in the dither matrix is changed in response to the print resolution. This makes it possible to change the value wherein the dot used in the first dot formation determining section start to appear.

For example, when the print resolution is low, if the dots used by the first dot formation determining section as large dots or dark dots are not used frequently, many gaps will be produced on a recording medium, with the result that density will be insufficient. To prevent this, if the print resolution is low, the predetermined value is reduced so that the dots used in the first dot formation determining section will appear earlier.

It is also possible to arrange such a configuration that the predetermined value in the dither matrix is changed in response to the recording mode. This will make it possible to change the value wherein the dots used in the first dot formation determining section start to appear.

For example, in the high-quality image mode, the dots used by the second dot formation determining section as small dots or light dots must be frequently employed in order to decrease the graininess. Thus, in the high-quality image mode, the predetermined value is increased so that the dots used in the first dot formation determining section do not appear easily.

It is also possible to arrange such a configuration that the predetermined value in the dither matrix is changed according to the type of the recording medium. This will make it possible to change the value wherein the dots used in the first dot formation determining section start to appear.

For example, plain paper has a lower ink absorbing capacity than special-purpose paper. When such a recording medium is used, the amount of ink must be reduced. In this case, the dots as dark dots used by the first dot formation determining section are mixed in the stage of a lower gradation value. This procedure provides the required density, despite a small amount of ink, thereby saving the overall amount of ink. Thus, when plain paper is used as a recording medium, the predetermined value is set to a small value so that the dots used by the first dot formation determining section will be produced earlier.

EMBODIMENT 2

The following describes the image forming method as a second embodiment.

Figure 8:
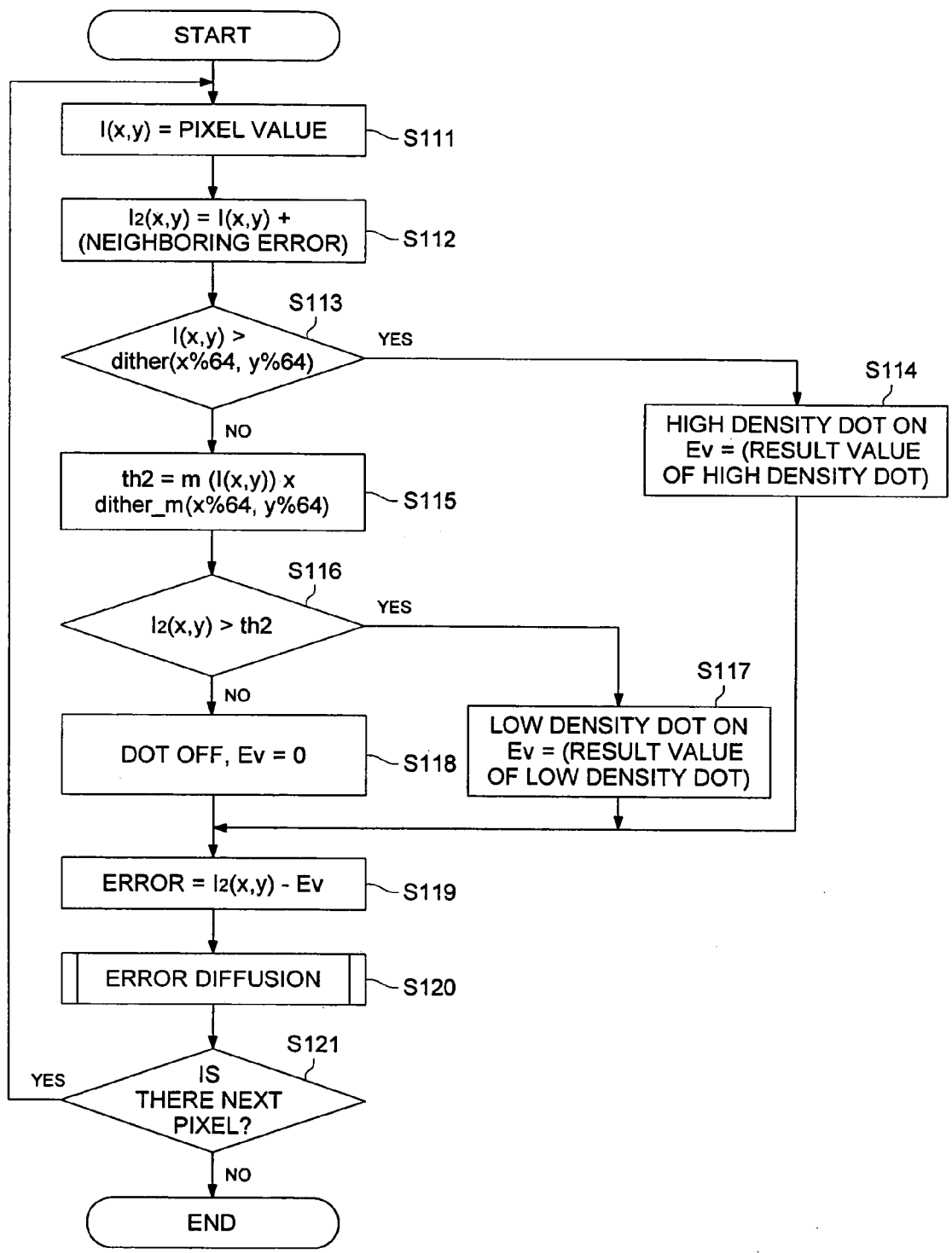
FIG. 8 is a flowchart representing the halftone processing in the second embodiment.

The second embodiment is the same as the first embodiment except that the aforementioned halftone processing in Step S4 is applied in the manner shown in the flowchart of FIG. 8. The following will omit the description of the same processing and structure.

Referring to the flowchart of FIG. 8, the following describes the processing of halftone in the image forming method as the second embodiment.

This method is the same as that shown in the description of the first embodiment except the second dot formation determining process and the second calculating process.

The first dot formation determining step is performed by the first dot formation determining section (the first dot formation determining function of the image forming program) 51. Dither processing is employed in the first dot formation determining step.

The pixel value in the predetermined target pixel is assumed as I (x, y) (Step S11).

Then for the use of the second dot formation determining section 54, the corrected pixel value $I_2$ (x,y) is calculated by adding the neighboring error (accumulated value of quantization error), which is diffused from processed pixel by error calculating section and error diffusion section (Step S112).

Next, I (x, y) is compared with the dither (x % 64, y % 64) which is the value of threshold value matrix stored in advance (Step S113). If, as a result of this calculation, it has been determined that I (x, y) is greater than the value of threshold value matrix dither (x % 64, y % 64), then the high density dot is turned on and the result value of high density dot (herein 512) is substituted to the result value Ev (Step S114).

Conversely, when it has been determined that pixel value I (x, y) is not greater than dither (x % 64, y % 64), the system goes to the second dot formation determining step implemented by the second dot formation determining section (second dot formation determining function of the image forming program) 54 shown in FIG. 1. This second dot formation determining step utilizes error diffusion processing to perform the dot formation determination.

Firstly, the threshold value th2 is calculated to be used in the second dot formation determining step (Step S115). Herein, the first calculating section (the first calculating function of the image forming program) 52 conducts the first calculating step to correct the value of threshold value matrix of the first dot formation determining step. And, the second calculating section (the second calculating function of the image forming program) 53 conducts the second calculating step to calculate the threshold value to determine whether to form the dot in the error diffusion process by utilizing the value of the corrected threshold value matrix, which has been calculated in the first calculating step.

To be more specific, firstly, the threshold value matrix, which is shifted (subtracted) by a certain value in the first calculating step such that the average value of threshold value matrix becomes zero, is stored as the dither_m(x, y). Further in the first calculating step, the value of matrix dither_m(x, y) is multiplied by the term m(I(x, y)) to modulate the amplitude of the threshold value matrix in accordance with the pixel value of the target pixel, and the obtained value is utilized as the threshold value of the error diffusion process in the second calculating step.

The obtained threshold value th2 is compared with $I_2$ (Step S116). When $I_2$ (x, y) is greater than th2, the low density dot is turned on and the result value of low density dot (herein 255) is substituted to the result value Ev(Step. S117). When $I_2$ (x, y) is not greater than th2, the low density dot is turned off and 0 is substituted to the result value Ev(Step S118).

After that, the error calculating section calculates the error $I_2$ (x, y)–Ev by using the result value Ev of S114, S117, or S118 (Step S119). Then the error diffusion section assigns a prescribed weight to the error and diffuses to the unprocessed neighboring pixels (Step S120).

Then a decision step is taken to determine if there is the next pixel or not (Step S121). Upon processing of all pixels, halftone processing terminates. Lastly, the image forming apparatus 1 issues an instruction to all pixels to instruct which dots should be formed and which dots should not be formed. The image recording section records (outputs) the image.

EMBODIMENT 3

The following describes the image forming method as a third embodiment.

Figure 9:
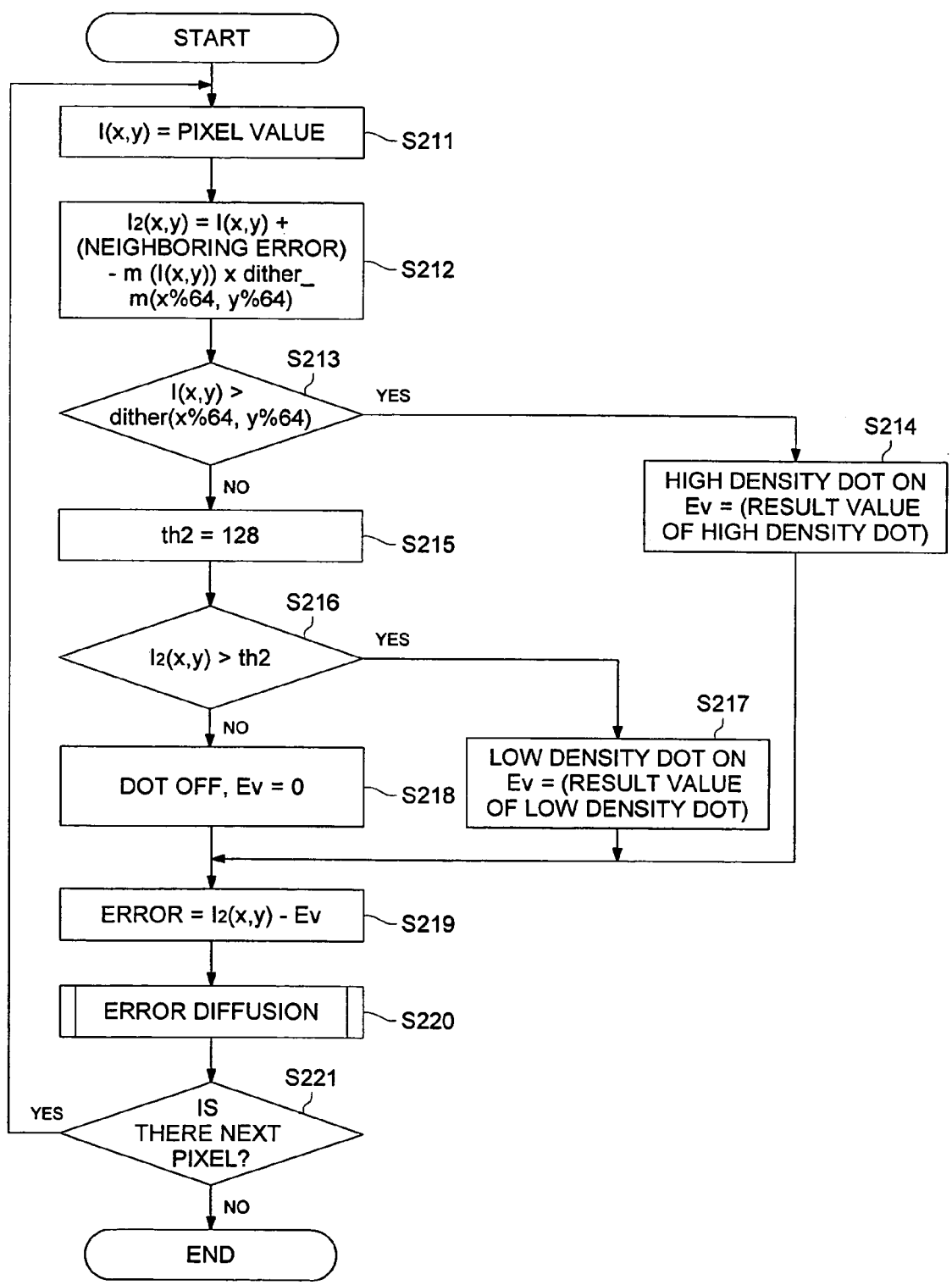
FIG. 9 is a flowchart representing the halftone processing in the third embodiment.

The third embodiment is the same as the first embodiment except that the aforementioned halftone processing in Step S4 is applied in the manner shown in the flowchart of FIG. 9. The following will omit the description of the same processing and structure.

Referring to the flowchart of FIG. 9, the following describes the processing of halftone in the image forming method as the third embodiment.

This method is the same as that shown in the description of the first embodiment except the second dot formation determining process and the second calculating process.

Herein, the first dot formation determining step by the first dot formation determining section shown in FIG. 1 (the first dot formation determining function of the image forming program) 51, and the second dot formation determining step by the second dot formation determining section (the second dot formation determining function of the image forming program) 53 are executed in parallel. In the first dot formation determining step, dither processing is employed, and in the second dot formation determining step, error diffusion processing is employed to determine the dot formation.

Firstly, the pixel value in the predetermined target pixel is assumed as I (x, y) (Step S211).

Then the first calculating section (the first calculating function of the image forming program) 52, and the second calculating section (the second calculating function of the image forming program) 53 calculate the corrected pixel value as $I_2$ (x, y) (Step S212). In this embodiment, the neighboring error (accumulated value of quantization error), which is diffused from processed pixel by error calculating section and error diffusion section, is added to the pixel value I(x, Y). Further, the threshold value matrix, which is shifted (subtracted) by a certain value in the first calculating step such that the average value of threshold value matrix becomes zero, is stored as the dither_m(x, y). Further in the first calculating step, the value of matrix dither_m(x % 64, y % 64) is multiplied by the term m(I(x, y)) to modulate the amplitude of the threshold value matrix in accordance with the pixel value of the target pixel, and the obtained value is added to form the threshold value in the second calculating step by the second calculating section.

Next, I (x, y) is compared with the dither (x % 64, y % 64) which is the value of threshold value matrix stored in advance (Step S213). If, as a result of this calculation, it has been determined that I (x, y) is greater than the value of threshold value matrix dither (x % 64, y % 64), then the high density dot is turned on and the result value of high density dot (512 in this case) is substituted to the result value Ev (Step S214).

Conversely, when it has been determined that pixel value I (x, y) is not greater than dither (x % 64, y % 64), the threshold th2 to be used for the second dot formation determining step is set to 128 (Step S215).

Then, the $I_2$(x, y) is compared with th2 (Step S216). When the I (x, y) is greater than th2, the low density dot is turned on and the result value of low density dot (255 in this case) is substituted to the result value Ev (Step S214). Conversely, when the pixel value I (x, y) is not greater than th2, the low density dot is turned off and 0 is substituted to Ev (Step S218).

After that, the error calculating section calculates the error $I_2$ (x, y)–Ev by using the result value Ev of S214, S217, or S218 (Step S219). Then the error diffusion section assigns a prescribed weight to the error and diffuses to the unprocessed neighboring pixels (Step S220).

Then a decision step is taken to determine if there is the next pixel or not (Step S221). Upon processing of all pixels, halftone processing terminates. Lastly, the image forming apparatus 1 issues an instruction to all pixels to instruct which dots should be formed and which dots should not be formed. The image recording section records (outputs) the image.

EMBODIMENT 4

The following describes the image forming method as a fourth embodiment.

In this embodiment, a half tone processing to be used in an inkjet printer is described, the inkjet printer forming three types of dots, high density dot, mid density dot, and low density dot for each color of ink. The following will omit the description of the same processing and structure as that of the first embodiment.

Figure 10:
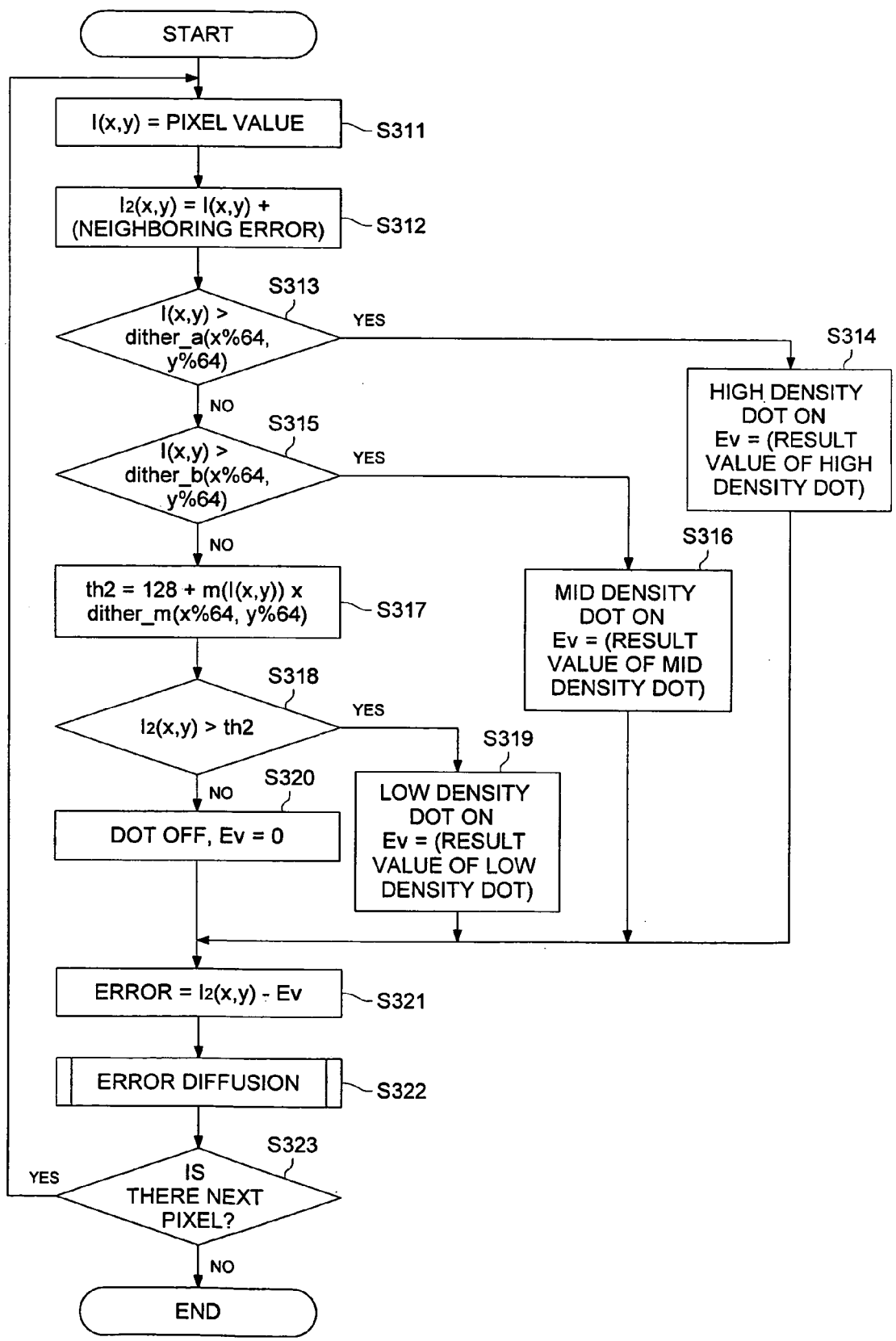
FIG. 10 is a flowchart representing the halftone processing in the fourth embodiment.
Figure 11:
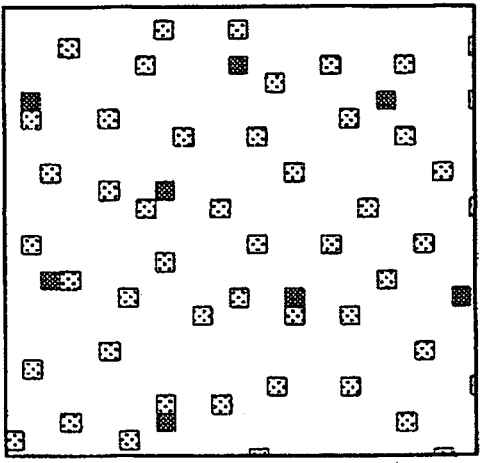
FIG. 11(a) is an image diagram showing the result of halftone processing of low density dots in the PRIOR ART.
FIG. 11(b) is an image diagram showing the result of halftone processing of high density dots in the PRIOR ART.
FIG. 11(c) is an image diagram showing the result of placing FIG. 11(a) on top of FIG. 11(b) in the PRIOR ART.
Figure 11:
Figure 11:
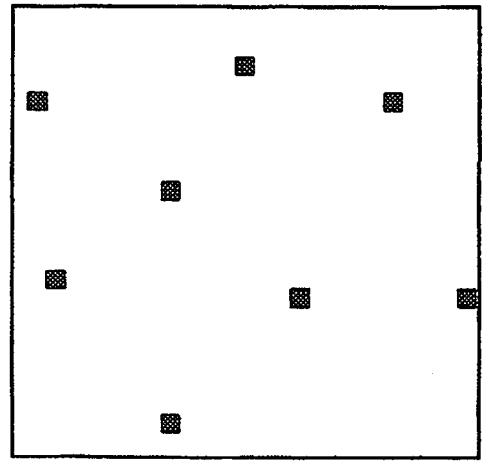
Figure 11:
Figure 11:
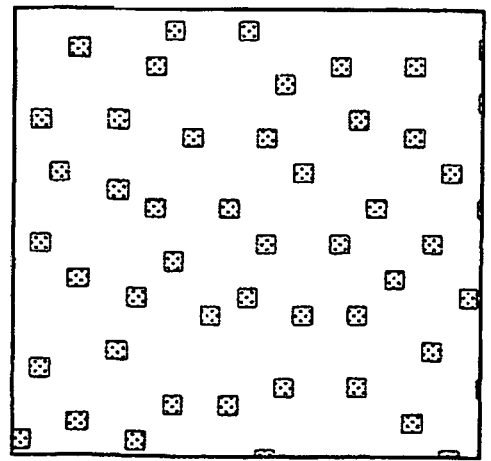

Referring to the flowchart of FIG. 10, the following describes the halftone processing in the image forming method as the fourth embodiment.

Herein, the first dot formation determining section 51 shown in FIG. 1 (the first dot formation determining function of the image forming program) executes the first dot formation determining step. Dither processing is employed in this first dot formation determining step.

Here the dither_a(x, y) denotes the threshold value matrix stored in advance for the use of determining the high density dot formation. In the present embodiment, so-called a dot dispersion type threshold value matrix is used. Herein, x denotes the pixel position in the main scanning direction and y denotes the pixel position in the sub scanning direction. This matrix has a size of 64×64 pixels. The input image is composed of 8 bits. (composed of 0 through 255 values), and a predetermined value to be described later is 150. Accordingly, the input pixel value and a predetermined value are added up, and the gradation value of 150 through 405 is included. It should be noted, however, that the threshold value matrix for determining the formation of high density dot is not restricted thereto. In the present embodiment, arrangements are made in such a way as to calculate the remainder obtained by dividing x by 64 and the remainder obtained by dividing y by 64, with respect to the pixel position (x, y), whereby the value of the threshold value matrix "dither_a(x % 16, y % 16)" is obtained.

And, the dither_b(x, y) denotes the threshold value matrix stored in advance for the use of determining the mid density dot formation. Same as the dither_a(x, y), a dot dispersion type threshold value matrix is used. This matrix also has a size of 64×64 pixels. The input image is composed of 8 bits (composed of 0 through 255 values), and on the input pixel value the value of 80, which is obtained by subtracting ascertain value (70 in this case) from the prescribed value 150 of the dither_a(x, Y), is added. Then the dither_b(x, y) includes values of 80-335 gradation values. It should be noted, however, that the threshold value matrix for determining the formation of mid density dot is not restricted thereto. In the present embodiment, arrangements are made in such a way as to calculate the remainder obtained by dividing x by 64 and the remainder obtained by dividing y by 64, with respect to the pixel position (x, y), whereby the value of the threshold value matrix "dither_b(x % 16, y % 16)" is obtained.

From the above description for this embodiment, the following equation is satisfied:

"dither_b(x % 64, y % 64)=dither_a( x % 64, y % 64)–constant (herein 70), wherein 0<constant<prescribed value (herein 150)"

Other detailed definitions and settings are omitted since they are the same as those of the first embodiment described above. In this embodiment, two of high density dot and mid density dot formation determining sections are provided in the first dot formation determining section.

Firstly, the pixel value in the predetermined target pixel is assumed as I (x, y) (Step S311).

Then for the use of the second dot formation determining section 54, the corrected pixel value $I_2$ (x,y) is calculated by adding the neighboring error (accumulated value of quantization error), which is diffused from processed pixel by error calculating section and error diffusion section (Step S312).

Next, I (x, y) is compared with the dither_a(x % 64, y % 64) which is the value of threshold value matrix stored in advance (Step S313). If, as a result of this comparison, it has been determined that I (x, y) is greater than the value of threshold value matrix dither_a (x % 64, y % 64), then the high density dot is turned on and the result value of high density dot (512 in this case) is substituted to the result value Ev (Step S314).

Conversely, when it has been determined that pixel value I (x, y) is not greater than dither (x % 64, y % 64),I (x, y) is compared with the dither_b(x % 64; y % 64) which is the value of threshold value matrix stored in advance (Step S315). If, as a result of this calculation, it has been determined that I (x, y) is greater than the value of threshold value matrix dither_b (x % 64, y % 64), then the mid density dot is turned on and the result value of mid density dot (382 in this case) is substituted to the result value Ev (Step S316).

Conversely, when it has been determined that pixel value I (x, y) is not greater than dither_b(x % 64, y % 64), the system goes to the second dot formation determining step implemented by the second dot formation determining section (second dot formation determining function of the image forming program) 54 shown in FIG. 1. This second dot formation determining step utilizes error diffusion processing to perform the dot formation determination.

Firstly, the threshold value th2 is calculated to be used in the second dot formation determining step (Step S317). Herein, the first calculating section (the first calculating function of the image forming program) 52 conducts the first calculating step to correct the value of threshold value matrix of the first dot formation determining step. And, the second calculating section (the second calculating function of the image forming program) 53 conducts the second calculating step to add the value of the threshold value matrix corrected in the first calculating step onto the threshold value (the threshold value is 128 since 8 bit processing is applied in this case) to determine whether to form the dot in the error diffusion process.

To be more specific, firstly, the threshold value matrix, which is shifted (subtracted) by a certain value in the first calculating step such that the average value of threshold value matrix dither_b(x, y) becomes zero, is stored as the dither_m (x, y). Further in the first calculating step, the value of matrix dither_m(x, y) is multiplied by the term m(I(x, y)) to modulate the amplitude of the threshold value matrix in accordance with the pixel value of the target pixel. And the obtained value is added to the threshold value 128 of the error diffusion processing in the second calculating step.

The obtained threshold value th2 is compared with $I_2(x, Y)$ (Step S318). When $I_2$ (x, y) is greater than th2, the low density dot is turned on and the result value of low density dot (255 in this case) is substituted to the result value Ev(Step S319). When $I_2$ (x, y) is not greater than th2, the low density dot is turned off and 0 is substituted to the result value Ev (Step S320).

After that, the error calculating section calculates the error $I_2$ (x, y)–Ev by using the result value Ev of S314, S316, S319 or S320 (Step S321). Then the error diffusion section assigns a prescribed weight to the error and diffuses to the unprocessed neighboring pixels (Step S322).

Then a decision step is taken to determine if there is the next pixel or not (Step S323). Upon processing of all pixels, halftone processing terminates. Lastly, the image forming apparatus 1 issues an instruction to all pixels to instruct which dots should be formed and which dots should not be formed. The image recording section records (outputs) the image.

Incidentally, three types of dots: high density dot, mid density dot, and low density dot are formed in the fourth embodiment, however, dot types should not be restricted to these. For example, the combinations of large, mid, small sized dots and dark, mid dark, light dots can be utilized, and further, 4 or more types of dots such as dark, light, large, and small dots can be formed.

As described above, according to each of the embodiments, the image forming apparatus, for forming an image using two or more types of dots having different densities per unit area in the same hue, includes:

a first dot formation determining section, for making comparison between the pixel value at the target pixel in the input image data and a first threshold value allocated at a position corresponding to the target pixel in a prescribed threshold value matrix, and for determining, based on the result of this comparison, whether or not a first type of dot out of two or more types of dots having the different densities per unit area, should be formed at the position corresponding to the aforementioned target pixel in an image to be formed;

a first calculating section for calculating a corrected threshold value matrix by correcting the aforementioned prescribed threshold value matrix;

a second calculating section for calculating a second determining condition by reflecting the corrected threshold value matrix, to determine whether or not a second type of dot out of the two or more types of dots should be formed; and a second dot formation determining section for determining whether the second type of dot should be formed or not, based on a value assigned with an error to the pixel value of the target pixel by an error diffusion method and second determining condition, at the position where the first dot formation section has determined not to form the first type of dot.

Therefore, in the first dot formation determining section, the dot formation is determined by the dither method using the threshold value matrix, in the second dot formation determining section dot formation is determined by the error diffusion method, and further the value of the threshold value matrix used in the first dot formation determination is reflected in that error diffusion method. With this procedure, since the dot is generated compulsorily in the first dot formation determining section, the position of the dot can be controlled, further, since the threshold value matrix is reflected in the error diffusion method, the interference of dot dispersion by the first dot formation determining section with the dot dispersion by the second dot formation determining section can be prevented. This enables the good dot dispersion to ensure formation of high quality image.

According to the first and fourth embodiments, since the second calculating section adds the value of the corrected threshold value matrix onto the threshold value when calculates the second determining condition to determine whether to form the second type of dot, the interference of dot dispersion by the first dot formation determining sections with the dot dispersion by the second dot formation determining sections can be prevented concretely. This enables the good dot dispersion to ensure formation of high quality image.

According to the second embodiment, since the second calculating section uses the value of the corrected threshold value matrix as the threshold value to determine whether to form the second type of dot by the error diffusion method, the interference of dot dispersion by the first dot formation determining sections with the dot dispersion by the second dot formation determining sections can be prevented concretely. This enables the good dot dispersion to ensure formation of high quality image.

According to the third embodiment, since the second calculating section adds the value of the corrected threshold value matrix onto the pixel value of the target pixel, when calculates the second determining condition to determine whether to form the second type of dot by the error diffusion method, the interference of dot dispersion by the first dot formation determining sections with the dot dispersion by the second dot formation determining sections can be prevented concretely. This enables the good dot dispersion to ensure formation of high quality image.

According to each of the embodiments, since the first calculating section subtracts a certain value from the value of the threshold value matrix so that the average value of the threshold value matrix value becomes zero, the ratio of dots generated by reflecting the threshold value matrix value can be made equal in macroscopic view. This enables the good dot dispersion to ensure formation of high quality image.

Further, according to each of the embodiments, since the first calculating section varies the amplitude of the threshold value matrix according with the pixel value of the target pixel, when the pixel value is such a value with which a specific texture is generated, the generation of specific texture to the error diffusion method can be prevented by increasing the amplitude of the threshold value matrix. This enables the good dot dispersion and ensures the formation of high quality image.

According to each of the embodiments, since the first calculating section varies the amplitude of the threshold value matrix according to the ratio of the dots determined to be generated by the first dot generation determining section, in cases where dots are distinctly conspicuous, for example, at the starting of dot appearance, the interference of dots with each other can be prevented by increasing the amplitude of the threshold value matrix. This enables the good dot dispersion and ensures the formation of high quality image.

According to each of the embodiments, since the second type of dot has lower density per unit area than that of the first type of dot, characteristic of the first type of dot, which is visually conspicuous, can be controlled. This enables the good dot dispersion and ensures the formation of high quality image.

According to each of the embodiments, since the threshold value matrix is a dot dispersion type threshold value matrix, when the first type of dot is generated, the second type of dot becomes difficult to be generated in the vicinity of the first type of dot. As the result, the good dot dispersion of the dot dispersion type can be achieved in total.

In cases where the threshold value matrix is a dot fattening type threshold value matrix, when the first type of dot is generated, the second type of dot becomes easy to be generated in the vicinity of the first type of dot. As the result, the overall good dot dispersion of the dot fattening type can be achieved.

The same advantages as the aforementioned advantages of the image forming apparatus can be obtained from the image forming method and image forming program of the present embodiment.

Without being restricted to the aforementioned embodiments, the present invention can be embodied in a great number of variations with appropriate improvement and design modification, without departing from the technological spirit and scope of the invention claimed.

For example, the output value and result value in the aforementioned embodiments may be changed in response to the number of bits to be processed and the number of gradations for quantization. Further, the output value depends on the output system. For example, the present invention can be arranged in such a way that quantization to 4 or more levels will be performed.

What is claimed is:

1. An image forming apparatus, for forming an image with using two or more types of dots having different densities per unit area in a same hue, comprising: a first dot formation determining section, for making comparison between a pixel value of a target pixel in the input image data and a first threshold value allocated at a position corresponding to the target pixel in a prescribed threshold value matrix, and for determining, based on a result of the comparison, whether or not a first type of dot, out of two or more types of dots having the different densities per unit area, should be formed at a position corresponding to the target pixel in an image to be formed; a first calculating section for calculating a corrected threshold value matrix by correcting the prescribed threshold value matrix; a second calculating section for calculating a second determining condition by reflecting the corrected threshold value matrix, to determine whether or not a second type of dot out of the two or more types of dots should be formed; and a second dot formation determining section for determining whether or not the second type of dot should be formed, based on a value obtained by assigning an error to the pixel value of the target pixel with an error diffusion process and the second determining condition, at the position where the first dot formation section has determined not to form the first type of dot.

2. The image forming apparatus of claim 1, wherein the second calculating section adds a value of the corrected threshold value matrix onto a threshold value of the second determining condition to determine whether or not the second type of dot should be formed.

3. The image forming apparatus of claim 1, wherein the second calculating section uses a value of the corrected threshold value matrix as a threshold value of the second determining condition to determine whether or not the second type of dot should be formed.

4. The image forming apparatus of claim 1, wherein the second calculating section adds a value of the corrected threshold value matrix onto the pixel value of the target pixel, to calculate the second determining condition to determine whether or not the second type of dot should be formed.

5. The image forming apparatus of claim 1, wherein the first calculating section subtracts a certain value from a value of the prescribed threshold value matrix so that an average value of values of the threshold value matrix becomes zero.

6. The image forming apparatus of claim 1, wherein the first calculating section varies amplitude of the prescribed threshold value matrix according to the pixel value of the target pixel.

7. The image forming apparatus of claim 1, wherein the first calculating section varies amplitude of the prescribed threshold value matrix according to a ratio of dots determined to be formed by the first dot formation determining section.

8. The image forming apparatus of claim 1, wherein the second type of dot has a lower density per unit area than a density per unit area of the first type of dot.

9. The image forming apparatus of claim 1, wherein the prescribed threshold value matrix is a dot dispersion type threshold value matrix.

10. The image forming apparatus of claim 1, wherein the prescribed threshold value matrix is a dot fattening type threshold value matrix.

11. An image forming method, for forming an image using two or more types of dots having different densities per unit area in a same hue, comprising: a first dot formation determining step, for making comparison between a pixel value of a target pixel in the input image data and a first threshold value allocated at a position corresponding to the target pixel in a prescribed threshold value matrix, and for determining, based on a result of this comparison, whether or not a first type of dot out of two or more types of dots respectively having different densities per unit area, should be formed at a position corresponding to the target pixel in an image to be formed; a first calculating step for calculating a corrected threshold value matrix by correcting the prescribed threshold value matrix; a second calculating step for calculating a second determining condition by reflecting the corrected threshold value matrix, to determine whether or not a second type of dot out of the two or more types of dots should be formed; and a second dot formation determining step for determining whether or not the second type of dot should be formed, based on a value obtained by adding an allocated error to the pixel value of the target pixel with an error diffusion process and the second determining condition, at the position where the first dot formation section has determined not to form the first type of dot.

12. The image forming method of claim 11, wherein the second calculating step adds a value of the corrected threshold value matrix onto a threshold value of the second determining condition to determine whether or not the second type of dot should be formed.

13. The image forming method of claim 11, wherein the second calculating step uses a value of the corrected threshold value matrix as a threshold value of the second determining condition to determine whether or not the second type of dot should be formed.

14. The image forming method of claim 11, wherein the second calculating step adds a value of the corrected threshold value matrix onto the pixel value of the target pixel, to calculate the second determining condition to determine whether or not the second type of dot should be formed.

15. The image forming method of claim 11, wherein the first calculating step subtracts a certain value from a value of the prescribed threshold value matrix so that an average value of values of the threshold value matrix becomes zero.

16. The image forming method of claim 11, wherein the first calculating step varies amplitude of the prescribed threshold value matrix according to the pixel value of the target pixel.

17. The image forming method of claim 11, wherein the first calculating step varies amplitude, of the prescribed threshold value matrix according to a ratio of dots determined to be formed by the first dot formation determining section.

18. The image forming method of claim 11, wherein the second type of dot has a lower density per unit area than a density per unit area of the first type of dot.

19. A computer readable storage medium having stored thereon a program for enabling a computer to realize following functions for forming an image with using two or more types of dots having different densities per unit area in a same hue, the functions comprising: a first dot formation determining function, for making comparison between a pixel value of a target pixel in the input image data and a first threshold value allocated at a position corresponding to the target pixel in a prescribed threshold value matrix, and for determining, based on a result of the comparison, whether or not a first type of dot, out of two or more types of dots having the different densities per unit area, should be formed at a position corresponding to the target pixel in an image to be formed; a first calculating function for calculating a corrected threshold value matrix by correcting the prescribed threshold value matrix; a second calculating function for calculating a second determining condition by reflecting the corrected threshold value matrix, to determine whether or not a second type of dot out of the two or more types of dots should be formed; and a second dot formation determining function for determining whether or not the second type of dot should be formed, based on a value obtained by adding an allocated error to the pixel value of the target pixel with an error diffusion process and the second determining condition, at the position where the first dot formation section has determined not to form the first type of dot.

* * * * *